United States Patent
Onodera

(10) Patent No.: US 6,181,435 B1
(45) Date of Patent: Jan. 30, 2001

(54) IMAGE FORMING METHOD AND APPARATUS

(75) Inventor: Ken Onodera, Yokohama (JP)

(73) Assignee: Canon Kabushiki Kaisha, Tokyo (JP)

(*) Notice: Under 35 U.S.C. 154(b), the term of this patent shall be extended for 0 days.

(21) Appl. No.: 08/886,426

(22) Filed: Jul. 1, 1997

(30) Foreign Application Priority Data

Jul. 5, 1996 (JP) .................................................. 8-176682

(51) Int. Cl.[7] .................................................. G06K 15/00
(52) U.S. Cl. .................... 358/1.14; 358/1.12; 358/261.2; 358/426; 358/450; 348/415; 341/51; 341/107; 382/173; 382/175; 382/232; 382/239
(58) Field of Search .................................. 395/114, 112; 358/261.2, 426, 450; 348/415; 341/51, 107; 382/173, 175, 232, 239

(56) References Cited

U.S. PATENT DOCUMENTS

| | | | |
|---|---|---|---|
| 5,299,027 | * 3/1994 | Nakamura et al. | 358/403 |
| 5,479,587 | 12/1995 | Campbell et al. | 395/116 |
| 5,504,842 | 4/1996 | Gentile | 395/114 |
| 5,506,944 | 4/1996 | Gentile | 395/114 |
| 5,539,865 | 7/1996 | Gentile | 395/115 |
| 5,544,290 | 8/1996 | Gentile | 395/115 |
| 5,680,521 | * 10/1997 | Pardo et al. | 395/112 |
| 5,689,589 | * 11/1997 | Gormish et al. | 382/239 |
| 5,832,126 | * 11/1998 | Tanaka | 382/239 |

FOREIGN PATENT DOCUMENTS

| | | |
|---|---|---|
| 510923 | 10/1992 | (EP) . |
| 4-323060 | 11/1992 | (JP) . |
| 6-87251 | 3/1994 | (JP) . |
| 6-233141 | 8/1994 | (JP) . |
| 6-284297 | 10/1994 | (JP) . |

* cited by examiner

*Primary Examiner*—Mark K. Zimmerman
*Assistant Examiner*—Lance W. Sealey
(74) *Attorney, Agent, or Firm*—Fitzpatrick, Cella, Harper & Scinto

(57) ABSTRACT

A printer converts print data in page description language into coded band data as a set of objects such as run-length data, trapezoid data and the like, in band units. Processing time to generate raster data from the coded band data is predicted, and the predicted time is used for determining whether or not the raster-data generation takes time longer than time for transmitting data to a printer engine. If it is determined that the raster-data generation time is longer than the data transmission time, raster data is generated from coded band data, and compressed and stored as preparation for printing. At this time, preparatory compression is performed to predict time for expanding the compressed data, for determining whether or not time for expansion is longer than data transmission time. If the expansion time is longer than the data trasnmission time, a coding method is changed, and the preparatory compression is performed again. If the expansion time is not longer than the data transmission time, the data is compressed and stored.

29 Claims, 10 Drawing Sheets

EXAMPLE OF REFERENCE PIXELS X
FOR PREDICTING PIXEL OF INTEREST ?

FIG. 9

| ST | LSZ | NLPS | NMPS | SWITCH | | ST | LSZ | NLPS | NMPS | SWITCH |
|----|-----|------|------|--------|---|----|-----|------|------|--------|
| 0 | 0x5a1d | 1 | 1 | 1 | | 57 | 0x01a4 | 55 | 58 | 0 |
| 1 | 0x2586 | 14 | 2 | 0 | | 58 | 0x0160 | 56 | 59 | 0 |
| 2 | 0x1114 | 16 | 3 | 0 | | 59 | 0x0125 | 57 | 60 | 0 |
| 3 | 0x080b | 18 | 4 | 0 | | 60 | 0x00f6 | 58 | 61 | 0 |
| 4 | 0x03d8 | 20 | 5 | 0 | | 61 | 0x00cb | 59 | 62 | 0 |
| 5 | 0x01da | 23 | 6 | 0 | | 62 | 0x00ab | 61 | 63 | 0 |
| 6 | 0x00e5 | 25 | 7 | 0 | | 63 | 0x008f | 61 | 32 | 0 |
| 7 | 0x006f | 28 | 8 | 0 | | 64 | 0x5b12 | 65 | 65 | 1 |
| 8 | 0x0036 | 30 | 9 | 0 | | 65 | 0x4d04 | 80 | 66 | 0 |
| 9 | 0x001a | 33 | 10 | 0 | | 66 | 0x412c | 81 | 67 | 0 |
| 10 | 0x000d | 35 | 11 | 0 | | 67 | 0x37d8 | 82 | 68 | 0 |
| 11 | 0x0006 | 9 | 12 | 0 | | 68 | 0x2fe8 | 83 | 69 | 0 |
| 12 | 0x0003 | 10 | 13 | 0 | | 69 | 0x293c | 84 | 70 | 0 |
| 13 | 0x0001 | 12 | 13 | 0 | | 70 | 0x2379 | 86 | 71 | 0 |
| 14 | 0x5a7f | 15 | 15 | 1 | | 71 | 0x1edf | 87 | 72 | 0 |
| 15 | 0x3f25 | 36 | 16 | 0 | | 72 | 0x1aa9 | 87 | 73 | 0 |
| 16 | 0x2cf2 | 38 | 17 | 0 | | 73 | 0x174e | 72 | 74 | 0 |
| 17 | 0x207c | 39 | 18 | 0 | | 74 | 0x1424 | 72 | 75 | 0 |
| 18 | 0x17b9 | 40 | 19 | 0 | | 75 | 0x119c | 74 | 76 | 0 |
| 19 | 0x1182 | 42 | 20 | 0 | | 76 | 0x0f6b | 74 | 77 | 0 |
| 20 | 0x0cef | 43 | 21 | 0 | | 77 | 0x0d51 | 75 | 78 | 0 |
| 21 | 0x09a1 | 45 | 22 | 0 | | 78 | 0x0bb6 | 77 | 79 | 0 |
| 22 | 0x072f | 46 | 23 | 0 | | 79 | 0x0a40 | 77 | 48 | 0 |
| 23 | 0x055c | 48 | 24 | 0 | | 80 | 0x5832 | 80 | 81 | 1 |
| 24 | 0x0406 | 49 | 25 | 0 | | 81 | 0x4d1c | 88 | 82 | 0 |
| 25 | 0x0303 | 51 | 26 | 0 | | 82 | 0x438e | 89 | 83 | 0 |
| 26 | 0x0240 | 52 | 27 | 0 | | 83 | 0x3bdd | 90 | 84 | 0 |
| 27 | 0x01b1 | 54 | 28 | 0 | | 84 | 0x34ee | 91 | 85 | 0 |
| 28 | 0x0144 | 56 | 29 | 0 | | 85 | 0x2eae | 92 | 86 | 0 |
| 29 | 0x00f5 | 57 | 30 | 0 | | 86 | 0x299a | 93 | 87 | 0 |
| 30 | 0x00b7 | 59 | 31 | 0 | | 87 | 0x2516 | 86 | 71 | 0 |
| 31 | 0x008a | 60 | 32 | 0 | | 88 | 0x5570 | 88 | 89 | 1 |
| 32 | 0x0068 | 62 | 33 | 0 | | 89 | 0x4ca9 | 95 | 90 | 0 |
| 33 | 0x004a | 63 | 34 | 0 | | 90 | 0x44d9 | 96 | 91 | 0 |
| 34 | 0x003b | 32 | 35 | 0 | | 91 | 0x3e22 | 97 | 92 | 0 |
| 35 | 0x002c | 33 | 9 | 0 | | 92 | 0x3824 | 99 | 93 | 0 |
| 36 | 0x5ae1 | 37 | 37 | 1 | | 93 | 0x32b4 | 99 | 94 | 0 |
| 37 | 0x484c | 64 | 38 | 0 | | 94 | 0x2e17 | 93 | 86 | 0 |
| 38 | 0x3a0d | 65 | 39 | 0 | | 95 | 0x56a8 | 95 | 96 | 1 |
| 39 | 0x2ef1 | 67 | 40 | 0 | | 96 | 0x4f46 | 101 | 97 | 0 |
| 40 | 0x261f | 68 | 41 | 0 | | 97 | 0x47e5 | 102 | 98 | 0 |
| 41 | 0x1f33 | 69 | 42 | 0 | | 98 | 0x41cf | 103 | 99 | 0 |
| 42 | 0x19a8 | 70 | 43 | 0 | | 99 | 0x3c3d | 104 | 100 | 0 |
| 43 | 0x1518 | 72 | 44 | 0 | | 100 | 0x375e | 99 | 93 | 0 |
| 44 | 0x1177 | 73 | 45 | 0 | | 101 | 0x5231 | 105 | 102 | 0 |
| 45 | 0x0e74 | 74 | 46 | 0 | | 102 | 0x4c0f | 106 | 103 | 0 |
| 46 | 0x0bfb | 75 | 47 | 0 | | 103 | 0x4639 | 107 | 104 | 0 |
| 47 | 0x09f8 | 77 | 48 | 0 | | 104 | 0x415e | 103 | 99 | 0 |
| 48 | 0x0861 | 78 | 49 | 0 | | 105 | 0x5627 | 105 | 106 | 1 |
| 49 | 0x0706 | 79 | 50 | 0 | | 106 | 0x50e7 | 108 | 107 | 0 |
| 50 | 0x05cd | 48 | 51 | 0 | | 107 | 0x4b85 | 109 | 103 | 0 |
| 51 | 0x04de | 50 | 52 | 0 | | 108 | 0x5597 | 110 | 109 | 0 |
| 52 | 0x040f | 50 | 53 | 0 | | 109 | 0x504f | 111 | 107 | 0 |
| 53 | 0x0363 | 51 | 54 | 0 | | 110 | 0x5a10 | 110 | 111 | 1 |
| 54 | 0x02d4 | 52 | 55 | 0 | | 111 | 0x5522 | 112 | 109 | 0 |
| 55 | 0x025c | 53 | 56 | 0 | | 112 | 0x59eb | 112 | 111 | 1 |
| 56 | 0x01f8 | 54 | 57 | 0 | | | | | | |

IMAGE FORMING METHOD AND APPARATUS

BACKGROUND OF THE INVENTION

This invention relates to an image forming method and apparatus for forming an image on a print medium.

DESCRIPTION OF RELATED ART

Conventionally, an image forming apparatus, called a page printer such as a laser-beam printer, performs image formation while holding raster data for one page in a raster memory.

In recent years, the resolution of such image forming apparatus has been improved. In 600 dpi resolution, for example, a memory capacity of 4 MB is required for forming an image of one page of A4 size. Thus, the resolution is being greatly improved. Conventionally, one pixel has been represented by two levels (1 bit), however, the representation is being improved to 16 levels (4 bits) to 256 levels (8 bits), requiring an increasingly large capacity of raster memory.

To suppress the increase in cost due to the increase of memory capacity, various memory-saving techniques have been proposed.

For example, Japanese Patent Application Laid-Open No. 6-87251 discloses temporarily translating image data in page description language into coded raster representation as intermediate data, and storing the data represented in coded raster representation. In the coded raster representation, objects which were described in the page description language are objects such as "bitmap", "run-length", "trapezoid", "box" and "fast boundary encoding bitmap" in a format which can be subjected to high-speed conversion to raster data, with data amounts less than the amounts of raster data. Note that the data translated into the coded raster representation is referred to "coded raster data". Thereafter, upon printing, the coded raster data is transferred to a printing unit (printer engine), while being converted into raster data where dots are arranged in the order of raster scanning.

In this manner, the memory resource is saved by holding image data to be printed as coded raster data. However, in this method, there are possibilities that the processing time for rasterizing coded raster data is longer than time for transmitting data to the printer engine (this status is called "over-run"), and that coded raster data cannot be stored in a predetermined memory. To solve the inconvenience, memory requirement for these cases are predicted. If this technique is used, the resolution of an image as the object of printing and/or the tone-level representation is degraded, thus the necessary memory capacity and processing time are reduced.

However, this method degrades the quality of output image. Japanese Patent Application Laid-Open Nos. 4-323060, 6-233141 and 6-284297 propose to compress raster data for reducing memory capacity. Especially, Japanese Patent Application Laid-Open No. 6-233141 discloses temporarily converting data in page description language into intermediate data and storing the intermediate data. In a case where the memory capacity for storing the intermediate data is short, or processing for generating the raster data from intermediate data is complicated and it takes too much time, the raster data is generated and compressed prior to printing.

However, compressing, especially lossless compressing provides variation in compression ratio, therefore, the size of compressed data is unknown before compression. Accordingly, this prior art requires processing such as garbage collection upon each data compression on all the available memory areas to generate a series of available areas, or processing for dividing the memory into cells and linking the cells to manage the set of cells as a continuity of virtual available memory areas.

The former processing must perform the garbage collection for each data compression, which causes overhead in processing time for memory rearrangement, thus degrading the overall performance. The latter processing causes memory overhead for link structure or for writing/reading data.

Further, upon expansion of compressed data, there is no problem if the expansion speed is faster than the time for transmitting data to the printer engine; however, in use of complicated compression method, the expansion speed cannot follow data transmission time, which causes over-run.

SUMMARY OF THE INVENTION

The present invention has been made in consideration of the above conventional techniques, and has its object to provide an image forming method and apparatus which reliably performs image formation without causing over-run.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is an example of a probability prediction table used in compression and expansion processings;

DETAILED DESCRIPTION OF THE PREFERRED EMBODIMENTS

Figure 1:
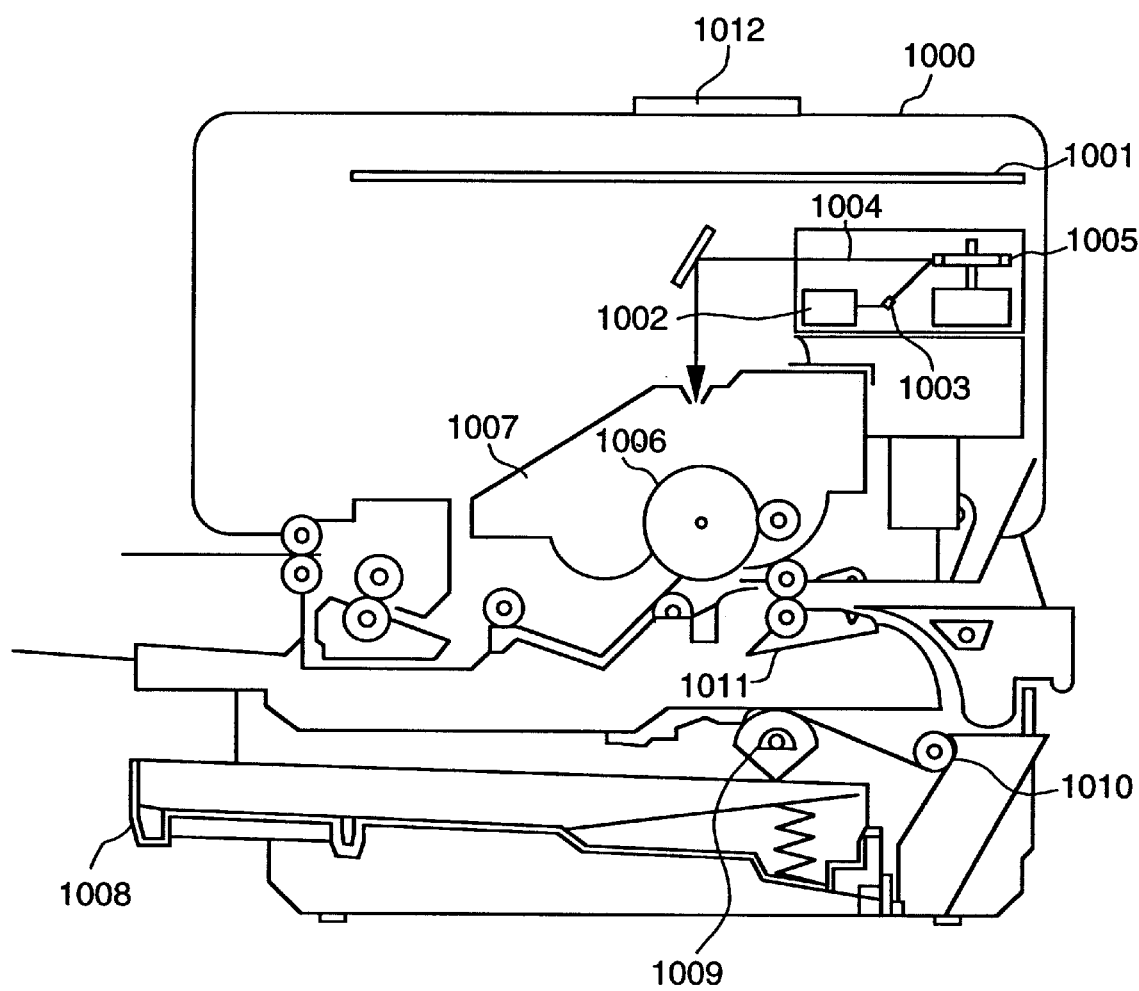
FIG. 1 is a cross-sectional view showing the structure of a printer according to an embodiment of the present invention.

Preferred embodiments of the present invention will now be described in detail in accordance with the accompanying drawings.

First, the outline of an image forming method and apparatus according to embodiments bf the present invention will be described, and detailed description will be made thereafter.

The image forming method and apparatus of the embodiments temporarily converts input page description language data into coded raster data in band units, and performs transmission, while generating raster data from the coded raster data, to a printer engine.

The image forming method and apparatus reduces the memory capacity requirements by generating raster data from coded raster data by band, and compressing and storing the raster data, in any of the following cases:

1. when memory shortage is detected during generation of a band of coded raster data;
2. when the predicted processing time for generating raster data from the band of coded raster data is longer than time for transmitting data to the printer engine, determined from predicted time for raster-data generation; or
3. when a mapping that is instruction to perform mapping impossible in band units, such as filling a closed area between bands, has been received.

More specifically,
A. the size of compressed data is predicted before raster data is compressed;
B. if the predicted compressed data size is less than a currently-obtainable memory size, a memory area for the predicted data size is assigned, and compression is performed;
C. further, if the predicted compressed data size is greater than the currently-obtainable memory size, memory rearrangement is performed to expand the currently-obtainable memory size. Then, the memory size is again compared with the predicted data size, and if the memory size is greater than the predicted data size, a memory area for the predicted data size is assigned, then compression is performed.

If the currently-obtained memory size is still insufficient, the current compression method is changed to another compression method requiring less memory, otherwise, the resolution and/or tone-level representation is degraded to reduce data amount. Then, compression is performed.

Further, according to another embodiment, the image forming method and apparatus performs compression processing while updating a probability prediction table used for arithmetic compression. In this case, the compressed data size is predicted while updating the probability prediction table, and the data of the updated probability prediction table is stored. Then, upon actual compression, the stored data of the probability prediction table is used as the initial data of the probability prediction table.

Further, the image forming method and apparatus according to another embodiment predicts an expansion processing speed at the same time of prediction of compressed data size, and determines whether or not the expansion processing speed is sufficient to follow data transmission to the printer engine. If the predicted expansion processing speed is not sufficient to follow data transmission, the current compression is changed to another compression method, otherwise, the resolution and/or tone-level representation is degraded to reduce data amount. Then, compression is performed.

[First Embodiment]

Hereinbelow, as an embodiment of the present invention, a printing system where a printer is connected to a host computer will be described in detail.

FIG. 1 is a cross-sectional view showing the mechanical structure of a laser-beam printer (hereinafter abbreviated to "LBP") applied to the present embodiment. In the LBP, a typical format of character pattern (form data) can be registered from a data source (not shown).

In FIG. 1, an LBP main body 1000 inputs character information (character coded) and form information supplied from the host computer (11 in FIG. 2) connected as an external device, or macro-instruction and the like, and stores the input data. Further, the LBP main body 1000 generates a character pattern or a form pattern in accordance with the input information, and forms an image on a print sheet as a print medium.

An operation panel 1012 has operation switches, an LED display and the like.

A printer control unit 1001 controls the overall LBP 1000, and analyzes character information and the like supplied from the host computer. The control unit 1001 mainly converts character information into a video signal of a corresponding character pattern, and outputs the video signal to a laser driver 1002.

The laser driver 1002 is a circuit for driving a semiconductor laser 1003. The laser driver 1002 turns on/off a laser beam 1004 emitted from the semiconductor laser 1003 in accordance with the input video signal.

The laser beam 1004 is scanned in left and right directions by a rotating polygon mirror 1005, scanning on an electrostatic drum 1006. This forms an electrostatic latent image of the character pattern on the electrostatic drum 1006.

A latent image is developed by a developing unit 1007 around the electrostatic drum 1006, then transferred to a print sheet.

A print sheet is a cut sheet contained in a paper cassette 1008 attached to the LBP 1000. The print sheet is fed into the apparatus by a paper-feed roller 1009 and conveyance rollers 1010 and 1011, and supplied to the electrostatic drum 1006.

Figure 2:
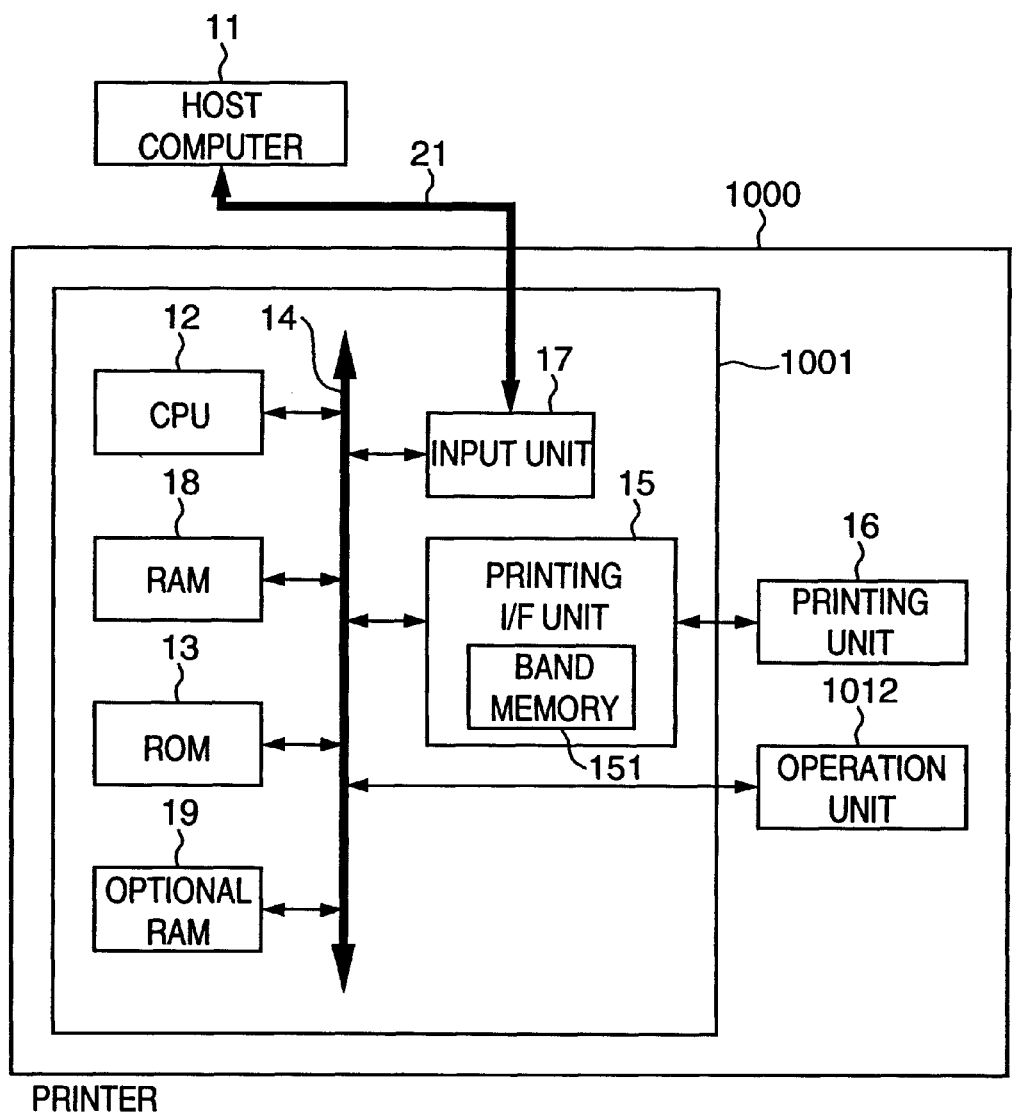
FIG. 2 is a block diagram showing the construction of a control system of the printer of the embodiment.

FIG. 2 is a block diagram showing the construction of a control system of the printing system of the present embodiment. The control system mainly comprises the printer control unit 1001 and the host computer 11 connected to the printer control unit 1001 via a predetermined interface using an interface cable 21.

The printer control unit 1001 comprises a printer CPU 12, an RAM 18, a ROM 13, a system bus 14, an input unit 17, a printing interface (I/F) unit 15 and the like.

These elements are inter connected via the system bus 14. The system bus 14 is connected to an operation unit 1012. The printing I/F unit 15 is connected to a printing unit 16.

The input unit 17 is connected via the inter face cable 21 to the host computer 11.

The host computer 11 sends data of a figure, a character, a bitmap image and the like, in command-format page description language, to the printer control unit 1001.

The printer CPU 12 controls the respective devices connected to the system bus 14, based on control programs stored in the ROM 13. Further, the printer CPU 12 controls output of image information to the printing unit 16 via the printing I/F unit 15. Further, the printer CPU 12 performs communication processing with the host computer 11 via the input unit 17. The printing I/F unit 15 has two band memories 151 respectively for mapping image data to be print-outputted from the printing unit 16. Upon printing, the printer CPU 12 generates raster data in one band memory, while outputs raster data from the other band memory. For printing for one page, the raster-data generation control and raster-data output control are alternately performed by using the two band memories. The printing unit 16 prints an image based on the image information inputted via the printing I/F unit 15.

The ROM 13 holds programs for the controls of the printer CPU 12, including a program for compressing/expanding raster data, and a preparatory compression program for predicting a compressed data size.

The RAM 18 functions as a main memory or a work memory for the printer CPU 12. The RAM 18 is used as a buffering area, an area for mapping image data, a storage area for storing environmental data and the like. Further, the RAM 18 is constructed so as to expand its memory capacity by an optional RAM 19 connected to an expansion port.

Figure 3:
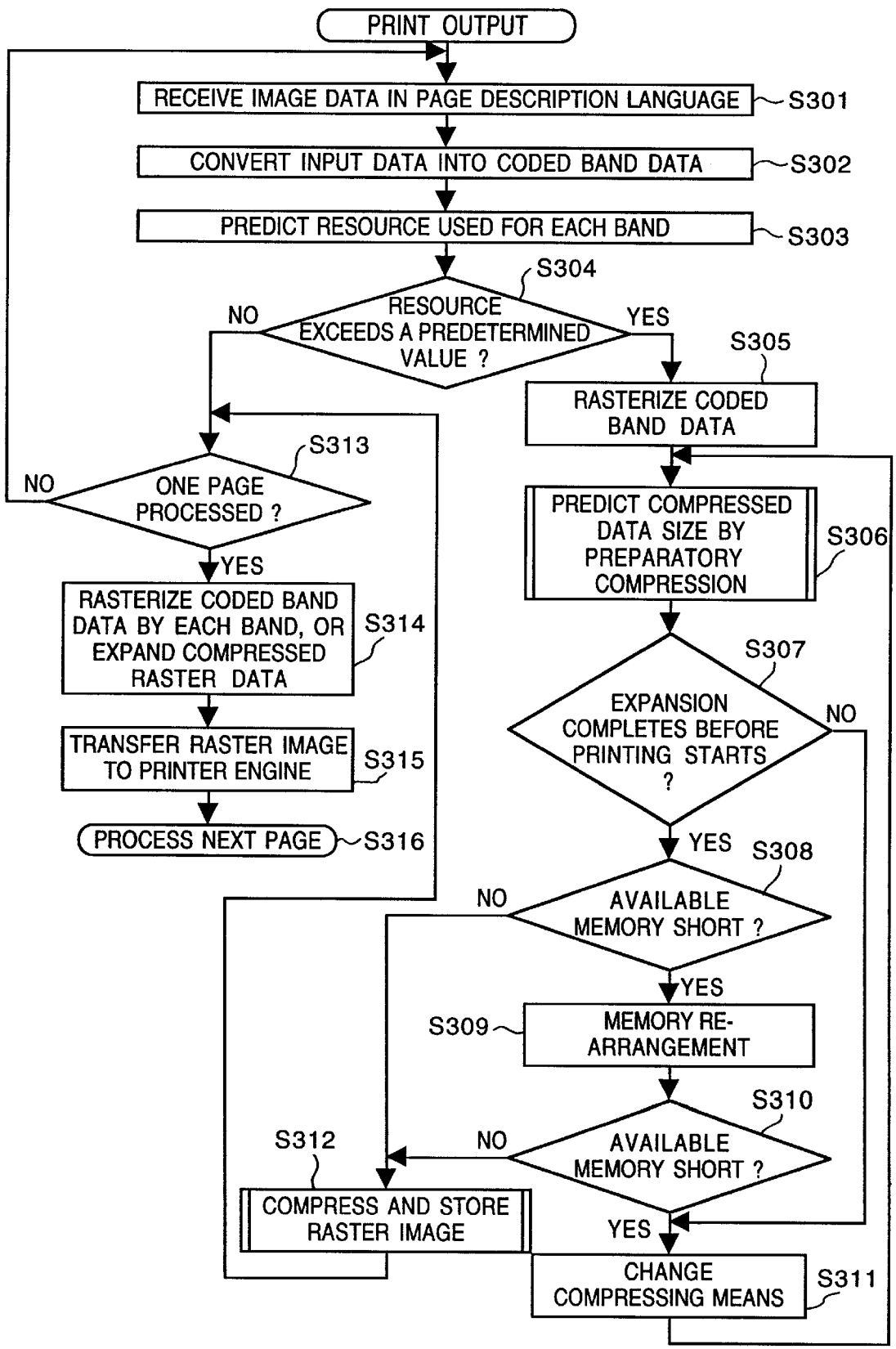
FIG. 3 is a flowchart showing an operation procedure of the printer.

Next, processing operation of the printer as the image forming apparatus of the present embodiment will be described with reference to FIG. 3.

When the power of the printer is turned on, the process enters step S301, at which the controller 1001 of the printer 1000 receives image data generated in page description language from the host computer 11 via the input unit 17.

At step S302, the input page description language is converted into coded raster data in band units. The coded raster data in band units will be particularly referred to as "coded band data".

The coded band data includes coded image objects such as band-based divided "bitmap", "run-length", "trapezoid", "box" and "fast boundary encoding bitmap", and a background pattern.

Note that the coded raster representation is disclosed in detail in Japanese Patent Application Laid-Open No. 6-87251.

At step S303, the resource necessary for mapping the coded band data into full-raster image data, i.e., processing time and memory capacity necessary for storing the coded band data for one page, are predicted. That is, by each coded band data included in one page, (a) processing time necessary for generating raster image data from coded band data, and
(b) memory capacity necessary for storing the coded band data are predicted. For the above prediction, the prediction method disclosed in Japanese Patent Application Laid-Open No. 6-87251 may be employed. Briefly, an approximate time for generating raster data from objects such as "bitmap", "run-length", "trapezoid", "box" and "fast boundary encoding bitmap" included in the coded band data is given as a function between the data size and data type. Accordingly, if processing time is predicted for the respective objects included in one coded band data and the respective processing time are summed for all band data, the processing time for the band can be predicted.

Further, a necessary memory capacity can be obtained from the size of the area in which the coded band data is stored. At step S304, it is determined whether or not the resource necessary for generating raster image data from coded band data of the current band can be obtained, based on the result of prediction at step S303. Regarding the memory capacity, a determination is not only made as to whether or not the memory capacity for generating raster data from the coded band data is sufficient. For example, regarding one band, if the predicted processing time necessary for generating raster image data from the coded band data exceeds a predetermined period, the raster data of the band is held as compressed raster data. In this case, a work area for compressing the raster data as well as the work area for generating the raster data is required. The determination is made on memory requirement, including such work area.

Note that the processing at step S304 may be performed after one coded band data has been generated, or after coded band data of all the bands included in one page has been generated. Upon determining whether or not the memory resource is insufficient, it is preferable to perform the processing at step S304 periodically, e.g., upon each generation of new coded band data from input data.

At step S304, if it is determined that the resource necessary for generating bitmap data of the current band is sufficient, the process proceeds to step S313. At step S313, it is determined whether or not processing of the current page has been completed. If coded band data still remains, the process returns to step S301, and the processing is performed on the remaining data in page description language.

On the other hand, if it is determined at step S304 that the printer resource is insufficient, i.e., the available memory capacity is insufficient or too much time is necessary for generating raster data, the process proceeds to step S305.

At step S305 and the subsequent steps, the coded band data is converted into compressed raster data. Hereinbelow, the procedure of conversion will be described.

At step S305, regarding a band for which it has been predicted that too much time is required for generating raster data or the memory capacity is insufficient, raster data is generated from the coded band data and mapped in one of two pre-allocated band memory areas.

Next, at step S306, the compressed data size of the raster data is determined by preparatory compression processing, and probability prediction table data for actual compression is obtained.

Figure 4:
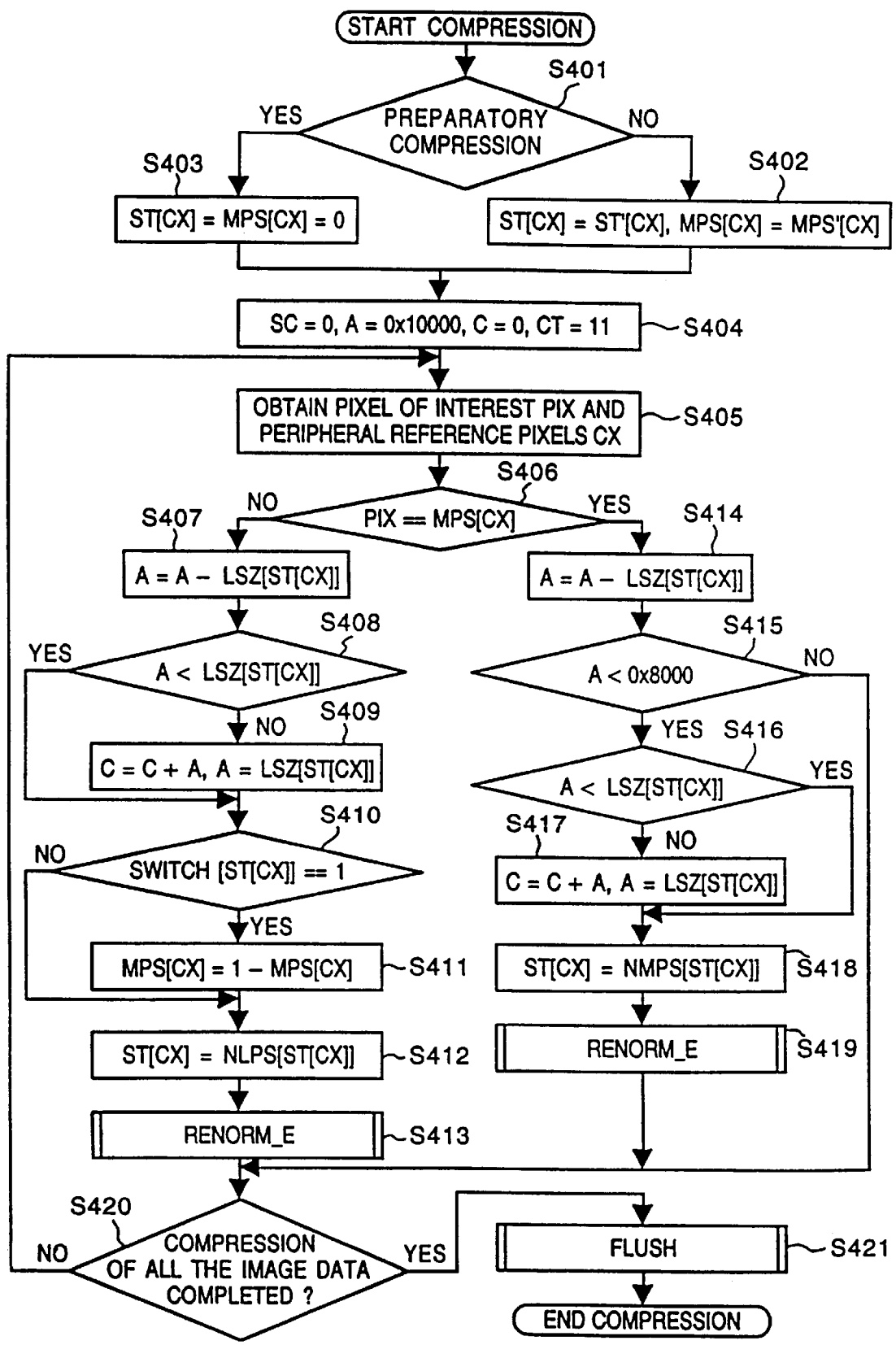
FIGS. 4 to 6 are flowcharts showing a compression processing procedure.
Figure 5:
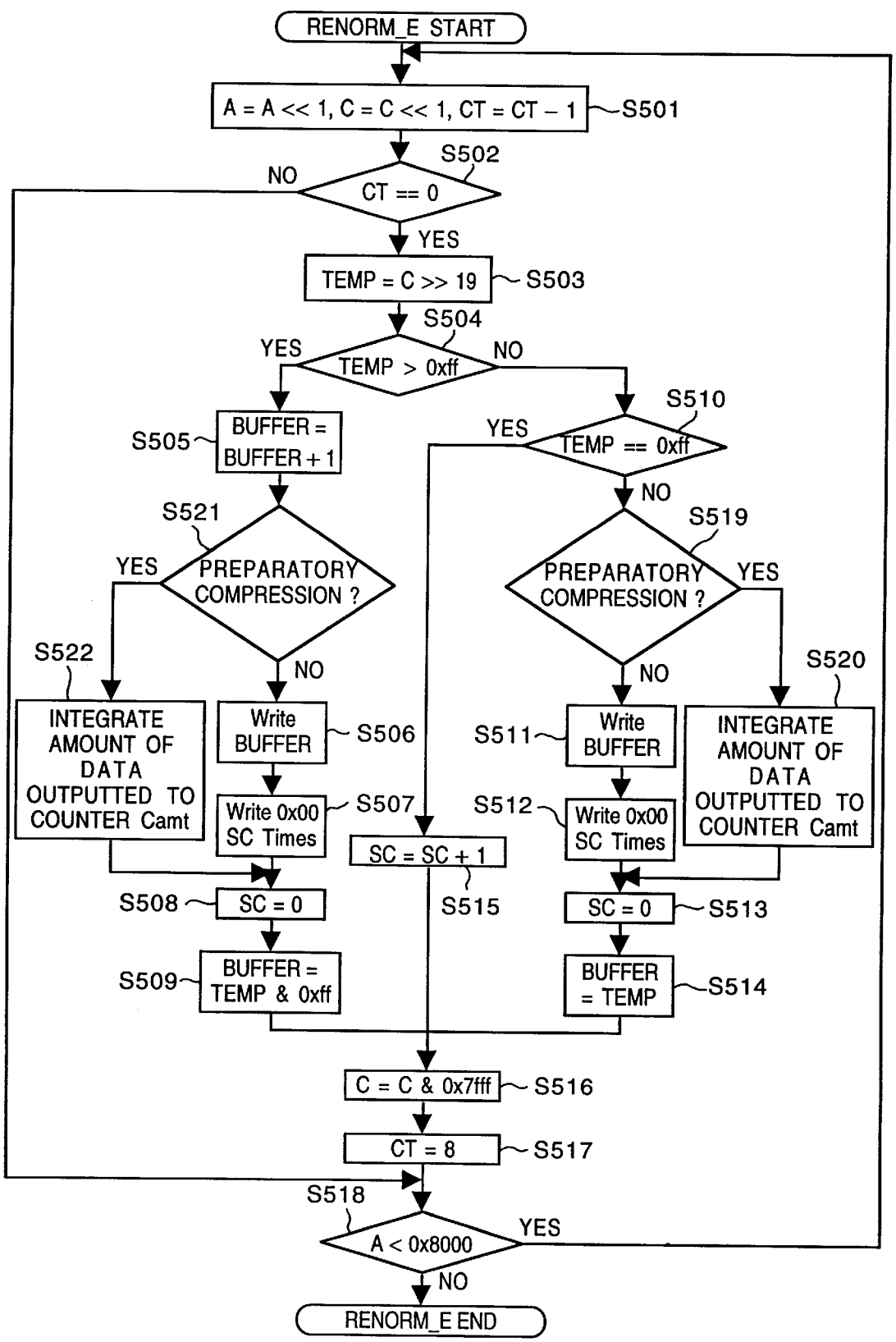
Figure 6:
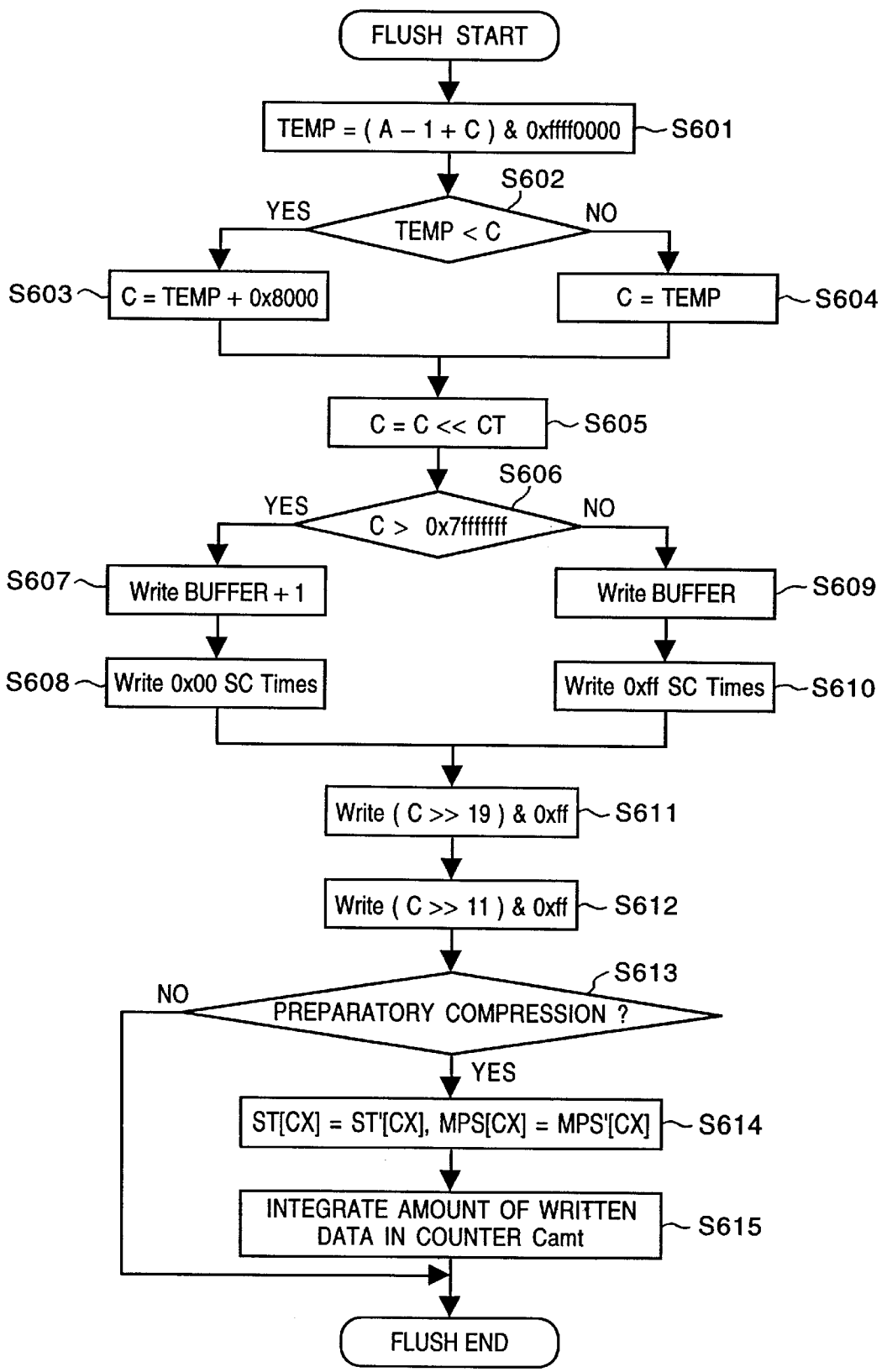

Note that the preparatory compression processing will be described in detail later with reference to the flowcharts of FIGS. 4 to 6.

Figure 7:
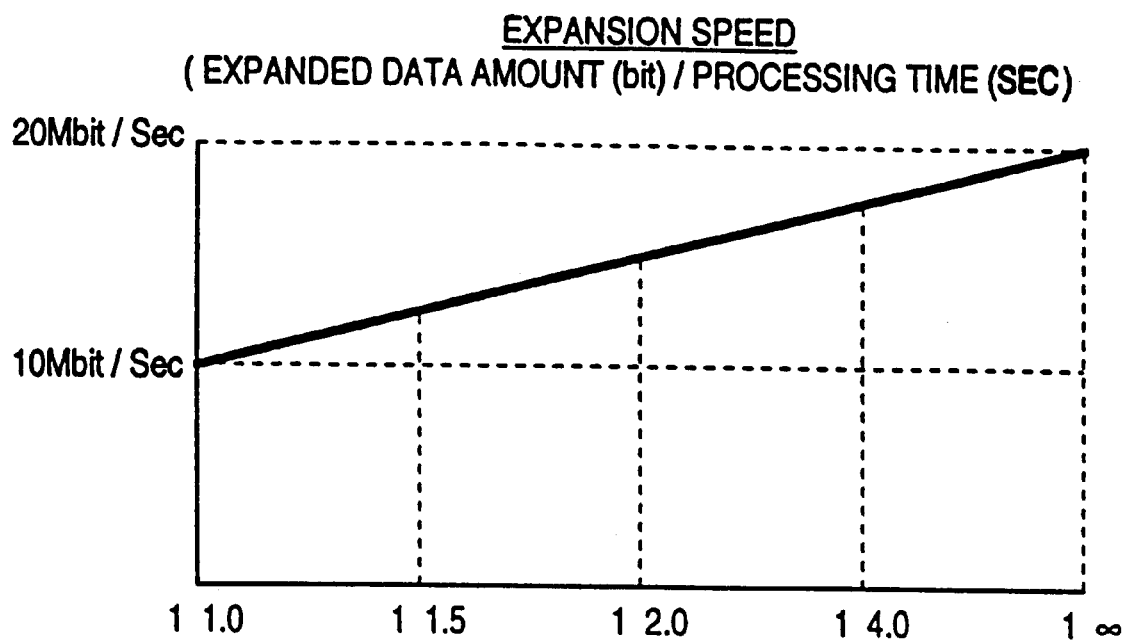
FIG. 7 is a line graph showing the correlation between a compression ratio and expansion processing speed.

At step S307, processing time for expansion is predicted from the compressed data size predicted at step S306. The prediction of expansion time depends on the compression method. Generally, expansion time is in strong correlation with a compression ratio. In an arithmetic compression method using prediction from peripheral pixels around a pixel of interest, used in the present embodiment, it is experimentally determined that the compression ratio and the expansion processing speed are in correlation as shown in FIG. 7. Accordingly, processing time for expansion can be substantially predicted by using the compressed data size predicted at step S306.

Then, the predicted expansion time is compared with time necessary for transferring band raster data by the printing I/F unit 15. As a result, if it is determined that the expansion time is shorter, i.e., the expansion processing can follow the printing, the process proceeds to step S308. At step S308, the compressed data size predicted at step S306 is compared with the currently-available memory capacity. If it is determined that the memory capacity is sufficient, the process proceeds to step S312, where the band raster data mapped in the band memory is compressed and stored in the memory, and the process returns to step S313.

If it is determined at step S308 that the memory capacity is insufficient, the process proceeds to step S309, at which memory area containing coded band data that has been already used for generating raster data, and memory area containing compressed raster data that has become unnecessary are released, thus garbage collection on the entire memory is performed, to obtain a continuity of available memory areas by memory rearrangement.

At step S310, the available memory capacity after the memory rearrangement is compared with the compressed data size predicted at step S306. If it is determined that the memory capacity is sufficient, the process proceeds to step S312. If it is determined that the memory capacity is still insufficient, the process proceeds to step S311, to change the compressing means.

More specifically, in the present embodiment, the compression method of the compressing means is changed to a method which reduces the data amount of raster data while appropriately thinning the data, and again compresses the raster data by the same compression method, and upon expansion, interpolates the thinned data with peripheral pixels. This method is an irreversible compression method which causes image degradation. When the compressing means has been changed, the process returns to step S306, at which the prediction of compressed data size is performed again.

On the other hand, if it is determined at step S313 that the mapping of the current page has been completed, the process proceeds to step S314, at which printing of the page is started.

At step S314, raster data is generated from the coded band data obtained at step S302, by each band, otherwise, the compressed raster data compressed at step S312 is expanded, and mapped alternately in the two band memories 151. At this time, it is assured that the time for mapping the raster data in the band memory is shorter than time for transmitting the band raster data to the printing unit 16, therefore, over-run never occurs.

At step S315, the raster data is transferred by the printing I/F unit 15 to the printing unit 16.

Steps S314 and S315 are executed in parallel in the two band memories, and in one band memory, sequentially executed. That is, when one band raster image has been transferred from one band memory by the printing I/F unit 15, the subsequent band raster image is mapped in the other band memory. The data generation and data output are alternately performed in the two band memories.

When the current page has been outputted, the process proceeds to step S316 for processing of the next page.

An image for one page is outputted by the above procedure.

<Algorithms of Preparatory and Actual Compression>

Next, algorithms of the preparatory compression at step S306 and the actual compression at step S312 will be described in detail with reference to the flowchart of FIGS. 4 to 6.

This procedure is based on the ITUT Reccommentations T.81 (so-called JBIG (Joint Bi-level Image Group) compression).

When preparatory or actual compression has been started, it is determined at step S401 whether preparatory compression or actual compression is currently performed. If it is determined that preparatory compression is currently performed, the process proceeds to step S403, at which all the values of columns ST[ ] and MPS[ ] of a prediction table for compression are initialized with a predetermined initial value "0".

On the other hand, if it is determined that actual compression is currently performed, the process proceeds to step S402, at which all the values of prediction table columns ST'[ ] and MPS'[ ], obtained by preparatory compression and stored in the RAM 18, are read and stored in the prediction table columns ST[ ] and MPS[ ].

Next, at step S404, register variables SC, A, C and CT necessary for arithmetic compression are initialized to predetermined values (SC=0, A=0×10000, C=0, CT=11). The meanings of these register variables are:

---
SC: counter
A: interval register
C: coded register
CT: counter
---

Figure 8:
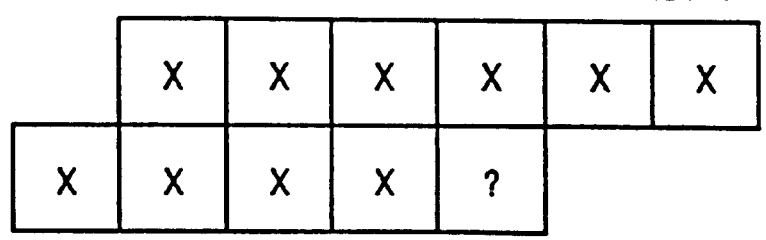
FIG. 8 is a schematic diagram showing an example of a pixel of interest and reference pixels used in compression and expansion processings.

Next, at step S405, as shown in FIG. 8, the value of a pixel of interest "?" to be encoded is entered in a register PIX, and its peripheral reference pixels "X" are entered in a register CX.

Note that in the present embodiment, ten pixels, as shown in FIG. 8, are employed as the peripheral reference pixels. The number of pixels is not limited to ten, and further, reference pixel positions are arbitrarily set. In this case, however, as the number of pixels increases, the size of prediction table increases, and if the number of pixels is too small, the compression ratio is degraded. Further, the compression ratio degrades unless the reference pixel positions are determined in consideration of the characteristic of image data to be compressed.

Next, at step S406, a predicted pixel value MPS[CX] corresponding to the reference pixel stored in the register CX is compared with the value of the pixel of interest PIX to determine whether or not they correspond with each other. If these values correspond with each other, the process proceeds to step S414, at which a subinterval value (LSZ [ST[CX]]) of current inferior probability is obtained from the table in FIG. 9, then subtracted from a current interval value A, thus a subinterval value of superior probability is obtained.

Next, at step S415, if the superior-probability subinterval value is less than 50% (0×8000), the process proceeds to step S416. If the superior-probability subinterval value is equal to or greater than the inferior-probability subinterval value, the process proceeds to step S417, at which the inferior-probability subinterval value is added to the coded strings, and the interval value is updated with this inferior-probability subinterval value.

Note that in FIG. 9, the column ST contains reference numbers of pixel pattens; LSZ; probability values of the pixel patterns. The table as shown in FIG. 9 is prepared in advance.

Next, the process proceeds to step S418, at which the prediction probability corresponding to the reference pixel value CX is updated to a value of the superior probability table from the table in FIG. 9. At step S419, coded-output processing (RENORM to be described later) from the coded strings is performed, then process proceeds to step S420.

On the other hand, if it is determined at step S406 that the predicted pixel value MPS[CX] corresponding to the reference pixel value CX does not correspond to the value of the pixel of interest PIX, the process proceeds to step S407, at which the current inferior-probability subinterval value (LSZ[ST[CX]]) is obtained from the table in FIG. 9. Then, the obtained value is subtracted from the current interval value A, thus a superior-probability subinterval value is obtained.

Next, at step S408, if this superior-probability subinterval value is greater than the inferior-probability subinterval value, the process proceeds to step S409, at which the inferior-probability subinterval is added to the coded array, and the interval value is updated with this inferior-probability subinterval value.

At step S410, it is determined whether or not a superior pixel/inferior pixel inverse switch (SWITCH[ST[CX]]) of the current probability table is ON (1). If it is ON (1), the process proceeds to step S411, at which the value of the predicted pixel value MPS[CX] is inversed.

Next, at step S412, the prediction probability table column ST[CX] corresponding to the reference pixel CX is updated to a value of the inferior probability table from the table in FIG. 9. At step S413, coded-output processing (RENORM_E to be described later) from the coded strings is performed, and the process proceeds to step S420.

At step S420, it is determined whether or not compression of the entire image data has been completed. If NO, the process returns to step S405, at which compression is continued with the next pixel as a new pixel of interest.

On the other hand, if it is determined at step S420 that all the compression of the entire image data has been completed, the process proceeds to step S421, at which termination processing of compression (FLUSH to be described later) is executed, thus the compression ends.

Next, the coded-output processing RENORM_E at steps S413 and S419 will be described with reference to the flowchart of FIG. 5.

At step S501, the interval register A and the coded register C are shifted by one bit. The number of shifts is counted by the counter CT.

At step S502, the counter CT is checked. If the value of the counter CT is "0", the process proceeds to step S503 and the subsequent steps, and compressed data for one byte is read from the coded register C. on the other hand, if the value of the counter CT is not "0", the process proceeds to step S518, at which if the value of the interval register A is not less than "0x8000", the RENORM_E processing is terminated, while if the interval register A is less than "0x8000", the process returns to step S501.

At step S503, first, the head one byte of the value of the coded register C, to be outputted to a variable TEMP, and a carry display bit are stored.

At step S504, if the variable TEMP is greater than "0xff", i.e., it has a carry, the process proceeds to step S505.

At step S505, the carry is added to a variable BUFFER holding the latest temporary output, which is not equal to "0xff".

If it is determined at step S521 that the current compression is not preparatory compression, the value is outputted (written) at step S506.

Note that in preparatory compression, the output (write) is not made by actually writing the value in the memory, but only by incrementing the data counter. In the present compression, with the increment of the data counter, data for one byte is written in the actual memory, and an output-data pointer is updated.

Next, at step S507, if the byte in the BUFFER has been temporarily outputted, all the bytes that were converted by the carry and resulted in "0x00" are outputted, the number of bytes is equal to the value of the counter SC that counted the number of "0x00" bytes since the value of the variable BUFFER was temporarily outputted.

Next, at step S508, the counter SC is cleared.

At step S509, the value from which the carry has been subtracted from the variable TEMP is set in the BUFFER as a new temporary output byte. If it is determined at step S521 that the current compression is preparatory compression, the amount of data to be written into a predetermined counter Camt is integrated at step S522.

On the other hand, returning to step S504, if it is determined that there is no carry, "TEMP=0xff", the process proceeds to step S510.

At step S510, it is checked whether or not the output byte TEMP is "0xff". If it is determined that the output byte TEMP is "0xff", the process proceeds to step S515, at which the counter SC is simply incremented so as to delay output until the carry is resolved. On the other hand, if it is determined at step S510 that the output byte TEMP is not "0xff", and if it is determined at step S519 that the current compression is not the preparatory compression, the process proceeds to step S511, at which the value of the variable BUFFER, holding the latest temporary output that is not equal to "0xff", is outputted (written). Then, at step S512, all the bytes that were converted by the carry and resulted in "0x00" are outputted, the number of bytes is equal to the value of the counter SC that counted the number of "0x00" bytes since the value of the variable BUFFER was temporarily outputted.

At step S513, the counter SC is cleared.

At step S514, the variable TEMP is set to the variable BUFFER as a new temporary output byte.

If it is determined at step S519 that the current compression is the preparatory compression, the amount of data to be written into the predetermined counter Camt is integrated. This counter is the same as that used at step S522. The value of the counter Camt becomes a predicted compressed data amount.

At step S516, codes for one byte are removed from the value of the coded register C.

At step S517, the value of the bit-number counter CT is initialized to "8", then, the process proceeds to step S518.

At step S518, it is checked whether or not the interval register A is less than "0x8000". If YES, the process returns to step S501 to repeat the processing, while if NO, terminates the RENORM_E processing.

<Termination of Compression Processing>

Next, the termination of compression (FLUSH) at step S421 will be described with reference to the flowchart of FIG. 6.

At step S601, the value of the interval register A and the value of the coded register C are added, then "1" is subtracted from the value result from the addition, and sixteen significant bits are masked. The resulting value is set to the variable TEMP.

At step S602, the variable TEMP is compared with the value of the coded register C. If the variable TEMP is less than the value of the coded register C, the process proceeds to step S603, at which the coded register C is set to "TEMP+0x8000". If the variable TEMP is not less than the value of the coded register C, the process proceeds to step S604, at which the coded register C is set to the variable TEMP.

Thus, the coded register C has been set to a value with the possible maximum number of zero bits in [C, C+A−1].

At step S605, the coded register C is shifted by the value of the bit counter CT. At step S606, it is determined whether or not the coded register value has a carry. If YES, the process proceeds to step S607, while if NO, proceeds to step S609.

At step S607, the value obtained by adding the carry to the variable BUFFER is outputted (written).

At step S608, all the bytes that were converted by the carry and resulted in "0x00" are outputted, the number of bytes is equal to the value of the counter SC that counted the number of "0xff" bytes since the value of the variable BUFFER was temporarily outputted.

On the other hand, if it is determined at step S606 that the coded register value has no carry, the process proceeds to step S609, at which the variable BUFFER is outputted (written).

At step S610, all the bytes from the BUFFER are outputted as "0xff ". The number of bytes is equal to the value of the counter SC that has counted the number of "0xff" bytes since the value of the variable BUFFER was temporarily outputted.

Next, the process proceeds to steps S611 and S612, at which codes for two bytes are outputted (written) from the coded register C.

Finally, at step S613, it is determined whether or not the current compression is preparatory compression. If YES, the process proceeds to step S614, at which all the values of the final prediction table columns ST[ ] and MPS[ ], sequentially updated by the preparatory compression, are stored in the prediction table columns ST'[ ] and MPS'[ ] which are storage areas in the RAM 18. The stored values are read and used upon actual compression and expansion.

<Expansion Processing>

Next, the expansion processing on compressed raster data, at step S314 (FIG. 3) will be described with reference to the flowcharts of FIGS. 10 and 11.

At step S1001, the prediction table columns ST'[ ] and MPS'[ ], generated in the above preparatory compression and stored, are read into the prediction table columns ST[ ] and MPS[ ].

At step S1002, the coded register C is cleared to "0", then the data is obtained for one byte by input-data obtaining processing (BYTEIN) to be described later, and the register is shifted by eight bits. Thus, data for three bytes are obtained, and the interval register A is initialized to "0x10000".

At step S1003, the peripheral reference pixel "X" of the pixel of interest "?" as shown in FIG. 8 is entered in the register CX. Note that the peripheral reference pixel must be the same as that upon compression.

Although the detailed explanation will be omitted, processing similar to that upon compression is performed at steps S1004 to S1008, thus the pixel value PIX is reproduced.

Figure 10:
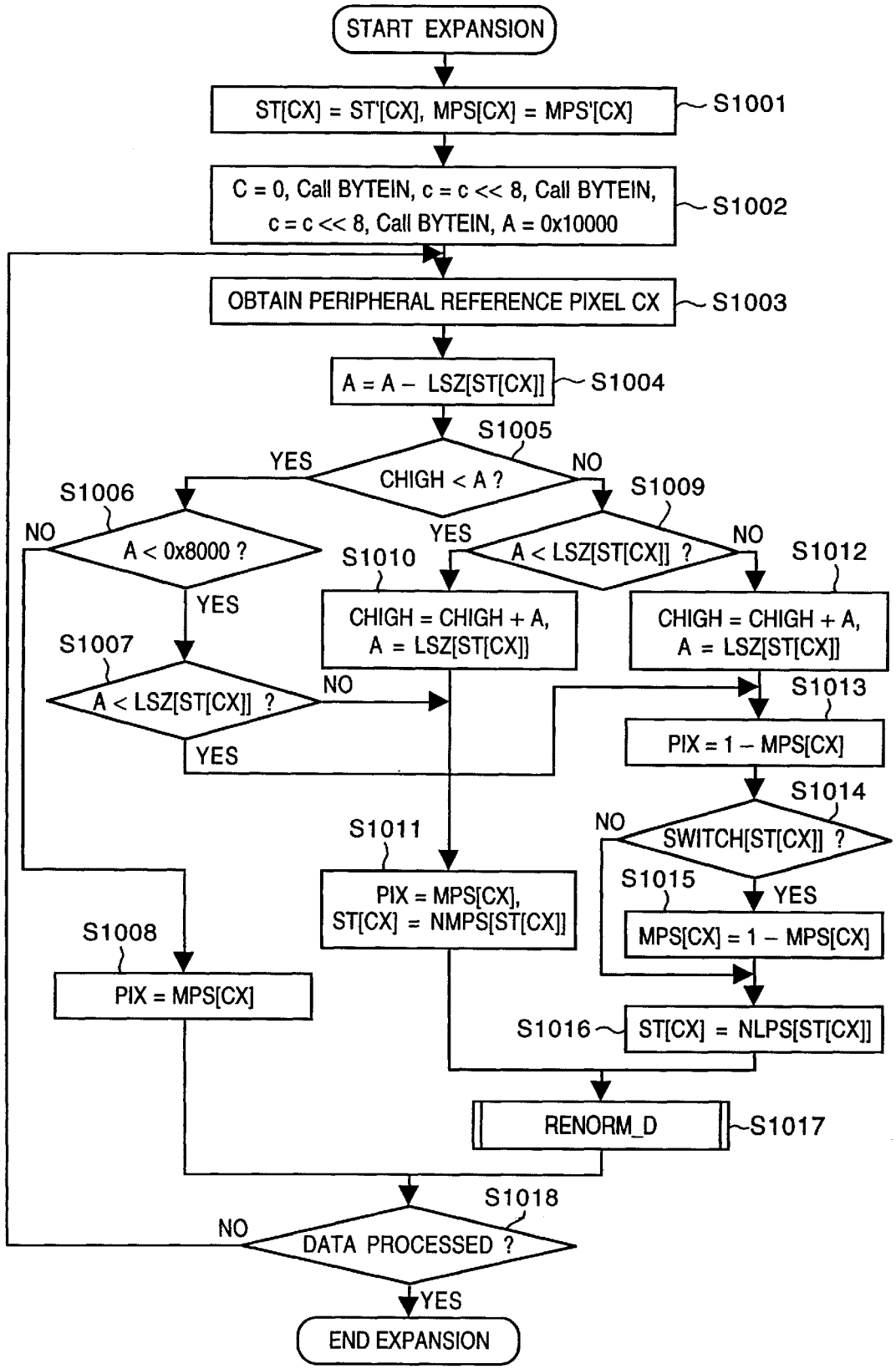
FIGS. 10 and 11 are flowcharts showing an expansion processing procedure.
Figure 11:
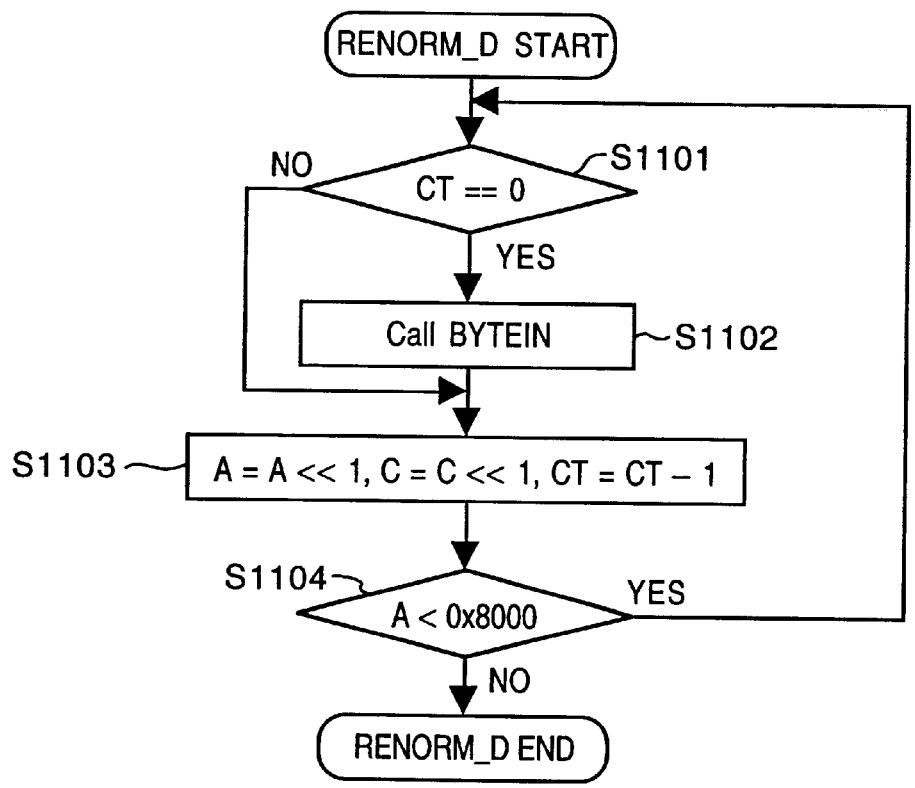
Figure 12:
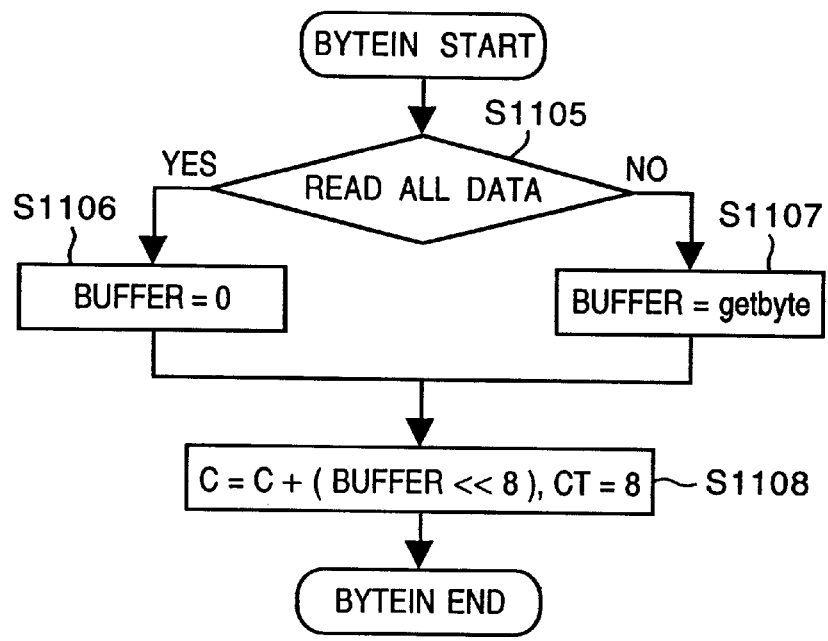
FIG. 12 is a flowchart showing input-data obtaining processing called at step S1002 in FIG. 10 and step S1102 in FIG. 11.

Note that CHIGH (S1005) in FIG. 10 denotes the value of the sixteen significant bits of the coded register C. FIG. 11 shows the flowchart of coded-input processing (RENORM_D) at step S1017, and FIG. 12, the flowchart of input-data obtaining processing (BYTEIN) called at step S1002 in FIG. 10 and S1102 in FIG. 11.

As described above, in the printer according to the present embodiment, data which seems to cause over-run due to too much time for mapping raster data from coded band data, or data requiring too large memory capacity, are converted into raster data and compressed in advance. This prevents over-run or status where the data cannot be stored into a memory. Further, the present embodiment employs, as a method for compressing raster data, a method which easily predicts expansion time from the result of compression. This more exactly predicts occurrence of over-run or memory shortage. Accordingly, regarding data that requires no mapping into raster data and compression, such processings are avoided, thus overhead of processing for prevention of over-run can be minimized.

The present embodiment employs the compression procedure based on the JBIG method, therefore, prediction tables LST and MPS, more suitable to data to be compressed, can be generated by preparatory compression. Accordingly, the preparatory compression can improve the compression ratio as well as prediction of compressed data size.

[Other Embodiments]

In the above embodiment, the compression is made by utilizing a part of sequential mode in so-called JBIG compression. The compression mode may be a progressive mode, otherwise, an arbitrary optional function such as ATMOVE may be added. Further, any other arithmetic coding compression method may be employed.

Further, if the improvement in compression ratio by the preparatory compression is not intended, the compression method is not limited to arithmetic coding compression, but an arbitrary compression method can be adopted from various methods such as a packbits compression, LZ77 and LZ78 compressions, a Huffman compression, an MR compression, an MH compression, an MMR compression, FBE compression and a JPEG compression.

Further, if a sufficient compression ratio has not been obtained, the present embodiment employs a lossy compression that reduces data amount by thinning pixels and retries compression, then interpolates the compressed data upon expansion. However, it may be arranged such that a compression method having a relatively-low compression ratio such as a packbits compression is switched to a compression method having a relatively-high compression ratio such as a JBIG or LZ77 compression; otherwise, a lossless compression with a low compression ratio such as a Huffman compression is switched to a lossy compression with a high compression ratio such as a JPEG compression.

Further, it is more preferable that the same JPEG compression is used, and its compression ratio is changed to a higher compression ratio (low quality) by parameters.

In the above embodiments, the processing speed upon expansion is predicted by experimentally using the compression ratio (ratio between data size before compression and compressed data size), however, the prediction method differs in use of compression method(s) other than that of the present embodiment.

Similar to the above embodiment, in use of a compression method having a strong correlation between expansion time and compression ratio, the expansion time may be predicted by experimentally using the correlation as in the above embodiment. In use of compression method(s) without such correlation, upon preparatory compression, preparatory expansion may also be performed to obtain expansion time. In this case, it provides a demerit of increase in processing time for preparatory compression, however, it provides a merit of more exact prediction of expansion time.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As described above, according to the embodiments, the compressed data size is predicted by preparatory compression, which minimizes the number of times of garbage correction, and prevents degradation of the overall performance due to processing time overhead caused by memory rearrangement.

Further, the compression ratio of actual compression can be improved by reusing a prediction probability table generated upon preparatory compression.

Further, the prediction of expansion time upon preparatory expansion avoids over-run where expansion of compressed data does not follow the data transmission to the printer engine.

The present invention is not limited to the above embodiments and various changes and modifications can be made within the spirit and scope of the present invention. Therefore, to appraise the public of the scope of the present invention, the following claims are made.

What is claimed is:

1. An image forming apparatus which performs printing processing based upon print data inputted from a host computer and described in a page description language, said apparatus comprising:
   generation means for generating intermediate data in band units, based upon the print data;
   determination means for determining whether raster data of a band of interest should be generated from the intermediate data and stored prior to printing, or the raster data of the band of interest should be generated from the intermediate data synchronously with printing and transmitted to a printing unit;
   prediction means for predicting a size of compressed raster data of the band of interest compressed by a first compression method and an expansion time required to expand the compressed raster data based upon data size, in a case in which it is determined that the raster data of the band of interest should be generated from the intermediate data and stored prior to printing;
   change means for changing the first compression method to a second compression method, if the expansion time predicted by said prediction means is greater than a predetermined value, wherein an expansion time required to expand compressed raster data of the band of interest compressed by the second compression method is less than the predetermined value;
   compression means for compressing the raster data of the band of interest by the first compression method to generate compressed raster data if the expansion time predicted by said prediction means is less than the predetermined value, or compressing the raster data of the band of interest by the second compression method if the expansion time predicted by said prediction means is greater than the predetermined value; and
   print control means for expanding the compressed raster data compressed by said compression means and transmitting the expanded raster data to the printing unit.

2. The image forming apparatus according to claim 1, wherein said prediction means predicts the expansion time by utilizing correlation between a compression ratio and expansion processing time, based on the compressed data size of the raster data predicted by said prediction means.

3. The image forming apparatus according to claim 1, wherein said change means changes the compression method to a compression method which reduces the expansion processing time, if the expansion time predicted by said prediction means is greater than a predetermined value.

4. The image forming apparatus according to claim 1, wherein the predetermined value is an upper limitation of allowable expansion time so as to prevent over-run in image formation by the printing unit.

5. The image forming apparatus according to claim 1, wherein the raster data is generated by:
   said generation means, wherein the intermediate data is a coded-band representation;
   raster-data amount prediction means for predicting a raster-data amount when the coded band representation generated by said generation means into full-raster image data; and
   mapping means for mapping the coded-band representation generated by said generation means into full-raster image data, if the raster data amount predicted by said raster-data amount prediction means is greater than a predetermined storage capacity of storage means.

6. The image forming apparatus according to claim 1, wherein if a capacity of storage means for storing the compressed raster data is insufficient, the compression method is changed to a compression method which reduces a data size of the expanded raster data.

7. The image forming apparatus according to claim 5, wherein the coded-band representation includes bitmap data divided in band units.

8. The image forming apparatus according to claim 5, wherein the coded-band representation includes run-length data divided in band units.

9. The image forming apparatus according to claim 5, wherein the coded-band representation includes trapezoid data divided in band units.

10. The image forming apparatus according to claim 5, wherein the coded-band representation includes box data divided in band units.

11. The image forming apparatus according to claim 5, wherein the coded-band representation includes fast boundary encoding bitmap data divided in band units.

12. The image forming apparatus according to claim 1, wherein said prediction means performs arithmetic compression while updating a predetermined probability table to predict the size of data which will be obtained by compressing the raster data.

13. The image forming apparatus according to claim 1, wherein if the expansion time predicted by said prediction means is greater than the predetermined value, the compression is continued by reducing a raster-data amount by degrading resolution or tone-level representation, and performing compression again.

14. An image forming method which performs printing processing based upon print data inputted from a host computer and described in a page description language, said method comprising:
- a generating step of generating intermediate data in band units, based upon the print data;
- a determining step of determining whether raster data of a band of interest should be generated from the intermediate data and stored prior to printing, or the raster data of the band of interest should be generated from the intermediate data synchronously with printing and transmitted to a printing unit;
- a prediction step of predicting a size of compressed raster data of the band of interest compressed by a first compression method and an expansion time required to expand the compressed raster data based upon data size, in a case in which it is determined that the raster data of the band of interest should be generated from the intermediate data and stored prior to printing;
- a change step of changing the first compression method to a second compression method, if the expansion time predicted in said predicting step is greater than a predetermined value, wherein an expansion time required to expand compressed raster data of the band of interest compressed by the second compression method is less than the predetermined value;
- a compression step of compressing the raster data of the band of interest by the first compression method to generate compressed raster data if the expansion time predicted in said predicting step is less than the predetermined value, or compressing the raster data of the band of interest by the second compression method if the expansion time predicted by said prediction means is greater than the predetermined value; and
- a print controlling step of expanding the compressed raster data compressed at said compression step and transmitting the expanded raster data to the printing unit.

15. The image forming method according to claim 14, wherein at said prediction step, the expansion time is predicted by utilizing correlation between a compression ratio and expansion processing time, based on the compressed data size of the raster data predicted at said prediction.

16. The image forming method according to claim 14, wherein at said change step, the compression method is changed to a compression method which reduces the expansion processing time, if the expansion time predicted at said prediction step is greater than a predetermined value.

17. The image forming method according to claim 14, wherein the predetermined value is an upper limitation of allowable expansion time so as to prevent over-run in image formation by the printing unit.

18. The image forming method according to claim 14, wherein the raster data is generated at:
- said generating step, wherein the intermediate data is a coded-band representation;
- a raster-data amount prediction step of predicting a raster-data amount when the coded band representation generated at said generating step into full-raster image data; and
- a mapping step of mapping the coded-band representation generated at said generating step into full-raster image data, if the raster data amount predicted at said raster-data amount prediction step is greater than a predetermined storage capacity of storage step.

19. The image forming method according to claim 14, wherein if a capacity of storage step of storing the compressed raster data is insufficient, the compression method is changed to a compression method which reduces a data size of the expanded raster data.

20. The image forming method according to claim 18, wherein the coded-band representation includes bitmap data divided in band units.

21. The image forming method according to claim 18, wherein the coded-band representation includes run-length data divided in band units.

22. The image forming method according to claim 18, wherein the coded-band representation includes trapezoid data divided in band units.

23. The image forming method according to claim 18, wherein the coded-band representation includes box data divided in band units.

24. The image forming method according to claim 18, wherein the coded-band representation includes fast boundary encoding bitmap data divided in band units.

25. The image forming method according to claim 14, wherein at said prediction step, arithmetic compression is performed while updating a predetermined probability table to predict the size of data which will be obtained by compressing the raster data.

26. The image forming method according to claim 14, wherein if the expansion time predicted at said prediction step is greater than the predetermined value, the compression is continued by reducing a raster-data amount by degrading resolution or tone-level representation, and performing compression again.

27. A computer-usable storage medium storing an executable program for printing processing based upon print data inputted from a host computer and described in a page description language, the program comprising the steps of:
- generating intermediate data in band units, based upon the print data;
- determining whether raster data of a band of interest should be generated from the intermediate data and stored prior to printing, or the raster data of the band of interest should be generated from the intermediate data synchronously with printing and transmitted to a printing unit;
- predicting a size of compressed raster data of the band of interest compressed by a first compression method and an expansion time required to expand the compressed raster data based upon data size, in a case in which it is determined that the raster data of the band of interest should be generated from the intermediate data and stored prior to printing;
- changing the first compression method to a second compression method, if the expansion time predicted in said predicting step is greater than a predetermined value, wherein an expansion time required to expand compressed raster data of the band of interest compressed by the second compression method is less than the predetermined value;
- compressing the raster data of the band of interest by the first compression method to generate compressed raster data, if the expansion time predicted in said predicting step is less than the predetermined value, or compressing the raster data of the band of interest by the second compression method if the expansion time predicted by said prediction means is greater than the predetermined value; and
- forming an image by expanding the raster data and transmitting the expanded raster data to the printing unit.

28. The apparatus according to claim 1, wherein the change means changes the compression method such that the expansion time, required for expanding the compressed data compressed by the compression method, is less than the predetermined value.

29. The apparatus according to claim 14, wherein the compression method is changed in the change step such that the expansion time, required for expanding the compressed data compressed by the compression method, is less than the predetermined value.

* * * * *

UNITED STATES PATENT AND TRADEMARK OFFICE
CERTIFICATE OF CORRECTION

PATENT NO. : 6,181,435 B1
DATED : January 30, 2001
INVENTOR(S) : Ken Onodera

Page 1 of 1

It is certified that error appears in the above-identified patent and that said Letters Patent is hereby corrected as shown below:

<u>Column 4,</u>
Line 47, "inter face" should read -- interface --.

<u>Column 15,</u>
Line 44, "prediction" should read -- prediction step --.

Signed and Sealed this

Twenty-seventh Day of November, 2001

Attest:

*Nicholas P. Godici*

*Attesting Officer*

NICHOLAS P. GODICI
*Acting Director of the United States Patent and Trademark Office*